(12) United States Patent
Schaefer (10) Patent No.: US 12,516,955 B2
(45) Date of Patent: Jan. 6, 2026

(54) SYSTEM AND METHOD FOR GENERATING A SEMANTIC MAP FOR A ROAD

(71) Applicant: Woven by Toyota, Inc., Tokyo (JP)

(72) Inventor: Alexander Christoph Schaefer, Fremont, CA (US)

(73) Assignee: Woven By Toyota, Inc., Tokyo (JP)

( * ) Notice: Subject to any disclaimer, the term of this patent is extended or adjusted under 35 U.S.C. 154(b) by 242 days.

(21) Appl. No.: 18/072,148

(22) Filed: Nov. 30, 2022

(65) Prior Publication Data

US 2024/0175705 A1 May 30, 2024

(51) Int. Cl.
*G01C 21/00* (2006.01)

(52) U.S. Cl.
CPC ................ *G01C 21/3822* (2020.08)

(58) Field of Classification Search
CPC ................................. G01C 21/3822
See application file for complete search history.

(56) References Cited

U.S. PATENT DOCUMENTS

| | | | | |
|---|---|---|---|---|
| 9,310,214 | B1* | 4/2016 | Tzamaloukas | G01C 21/3815 |
| 2020/0133294 | A1* | 4/2020 | Viswanathan | G05D 1/0088 |
| 2021/0331671 | A1* | 10/2021 | Kumano | B60W 30/12 |
| 2022/0250639 | A1* | 8/2022 | Ariannezhad | B60W 40/09 |

FOREIGN PATENT DOCUMENTS

CN 106802954 A 6/2017

OTHER PUBLICATIONS

Guo et al. "Automatic Lane-level Map Generation for Advanced Driver Assistance Systems using Low-cost Sensors", 2014 IEEE International Conference on Robotics and Automation (ICRA), 2014, pp. 3975-3982.

* cited by examiner

*Primary Examiner* — Joan T Goodbody
*Assistant Examiner* — Godfrey Aleksander Maciorowski
(74) *Attorney, Agent, or Firm* — Christopher G. Darrow; Darrow Mustafa PC

(57) ABSTRACT

Systems, methods, and other embodiments described herein relate to generating a semantic map for a road segment. In one embodiment, a method includes receiving sensor data related to a road segment, generating an orthogonal axis related to the road segment, and projecting the sensor data onto the orthogonal axis. The method includes generating a range of weighting functions based on potential characteristics of the road segment and determining a plurality of scores based on applying the range of weighting functions to the sensor data along the orthogonal axis. The method includes selecting one weighting function from the range of weighting functions based on one score of the plurality of scores, where the one score is a highest score. The method includes determining characteristics of the road segment based on the selected weighting function.

20 Claims, 4 Drawing Sheets

SYSTEM AND METHOD FOR GENERATING A SEMANTIC MAP FOR A ROAD

TECHNICAL FIELD

The subject matter described herein relates, in general, to systems and methods for generating a semantic map for a road.

BACKGROUND

Semantic road maps include information about a road such as the number of lanes, the lane widths, and the lane boundaries of the road. Semantic road maps may facilitate autonomous vehicle operation. However, semantic road maps are typically generated using methods that are both labor and resource intensive.

SUMMARY

In one embodiment, a system for generating a semantic map for a road segment is disclosed. The system includes a processor and a memory in communication with the processor. The memory stores machine-readable instructions that, when executed by the processor, cause the processor to receive sensor data related to the road segment, generate an orthogonal axis related to the road segment, and project the sensor data onto the orthogonal axis. The machine-readable instructions further include machine-readable instructions that, when executed by the processor, cause the processor to generate a range of weighting functions based on potential characteristics of the road segment, determine a plurality of scores based on applying the range of weighting functions to the sensor data along the orthogonal axis, and select a subset of weighting functions from the range of weighting functions that corresponds to a highest score of the plurality of scores. The machine-readable instructions further include machine-readable instructions that, when executed by the processor, cause the processor to determine characteristics of the road segment based on the subset of weighting functions.

In another embodiment, a method for generating a semantic map for a road segment is disclosed. The method includes receiving sensor data related to a road segment, generating an orthogonal axis related to the road segment, and projecting the sensor data onto the orthogonal axis. The method further includes generating a range of weighting functions based on potential characteristics of the road segment, determining a plurality of scores based on applying the range of weighting functions to the sensor data along the orthogonal axis, and selecting a subset of weighting functions from the range of weighting functions based on one score of the plurality of scores, where the one score is a highest score. The method includes determining characteristics of the road segment based on the subset of weighting functions.

In another embodiment, a non-transitory computer-readable medium for generating a semantic map for a road segment is disclosed. The non-transitory computer-readable medium includes instructions that, when executed by a processor, cause the processor to perform one or more functions. The instructions include instructions to receive sensor data related to a road segment, generate an orthogonal axis related to the road segment, and project the sensor data onto the orthogonal axis. The instructions include instructions to generate a range of weighting functions based on potential characteristics of the road segment, determine a plurality of scores based on applying the range of weighting functions to the sensor data along the orthogonal axis, and select a subset of weighting functions from the range of weighting functions that corresponds to the highest score of the plurality of scores. The instructions include instructions to determine characteristics of the road segment based on the subset of weighting functions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with systems and methods for generating a semantic map for a road are disclosed. A semantic map of a road includes the number of lanes along the road, the width of the lanes, the positions of lane markings, lane boundaries, and/or lane edges. The information included in the semantic map may facilitate autonomous vehicle operation.

Current methods of generating a semantic map for a road include image processing visual sensor data. However, these methods can be labor-intensive, time-consuming, expensive, and require extensive storage and computational resources as the prior art discloses detecting images, storing the images, and manually identifying and labelling objects and signage detected in the images. These methods also have a high level of inaccuracies.

Accordingly, systems, methods, and other embodiments associated with generating a semantic map for a road are disclosed. The system generates a semantic map of the road in a given area based on ground-truth vehicle trace points, sensor data and a road graph. This system generates the corresponding semantic representation for a road with certain characteristics, such as a road that is between but not including intersections. Additionally, the road has lanes that are parallel to the longitudinal axis (and the edges) of the road.

As an example, the system receives sensor data from vehicle sensors (such as TSS3 sensors) as vehicles travel along the road. The vehicle sensors such as Global Positioning Systems (GPS), inertial measurement unit (IMU), and accelerometers can include information about the location of the vehicle, known as trace points. Additionally, vehicle sensors that perceive an environment, such as cameras. LIDAR sensors, and radar sensors can include information about the environment, such as lane markings, known as key points.

The system generates a semantic map for the road by dividing the road into road segments. For each road segment, the system projects the trace points and key points in the sensor data related to the road segment onto an orthogonal axis. The system also generates a set of weighting functions based on all possible configurations of lane numbers and discretized lane widths within a predefined set of limits. As an example, the possible configurations may include (3.3) representing a two 3-meter lane road or (2, 3, 5) representing a three-lane road with lanes 2 meters, 3 meters, and 5 meters wide.

The weighting functions may be weighted to the trace points and/or the key points. The system then computes a heuristic score based on each of the weighting functions and trace points, and/or the key points. The system selects the lane number-lane width configuration matching the highest heuristic score as the lane number-lane width configuration for the road segment. Upon generating the semantic maps for the road segments, the system combines the semantic maps into a single semantic map representing the road.

The embodiments disclosed herein present various advantages over conventional technologies that generate a semantic map for a road based on image processing. First, the embodiments can provide a more accurate prediction of the characteristics of the lanes, such as number of lanes, lane width, positions of lane markings, lane boundaries, and lane edges. Second, the embodiments are less resource-intensive than the prior art. Third, the embodiments simplify the process of generating a semantic map for the road.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
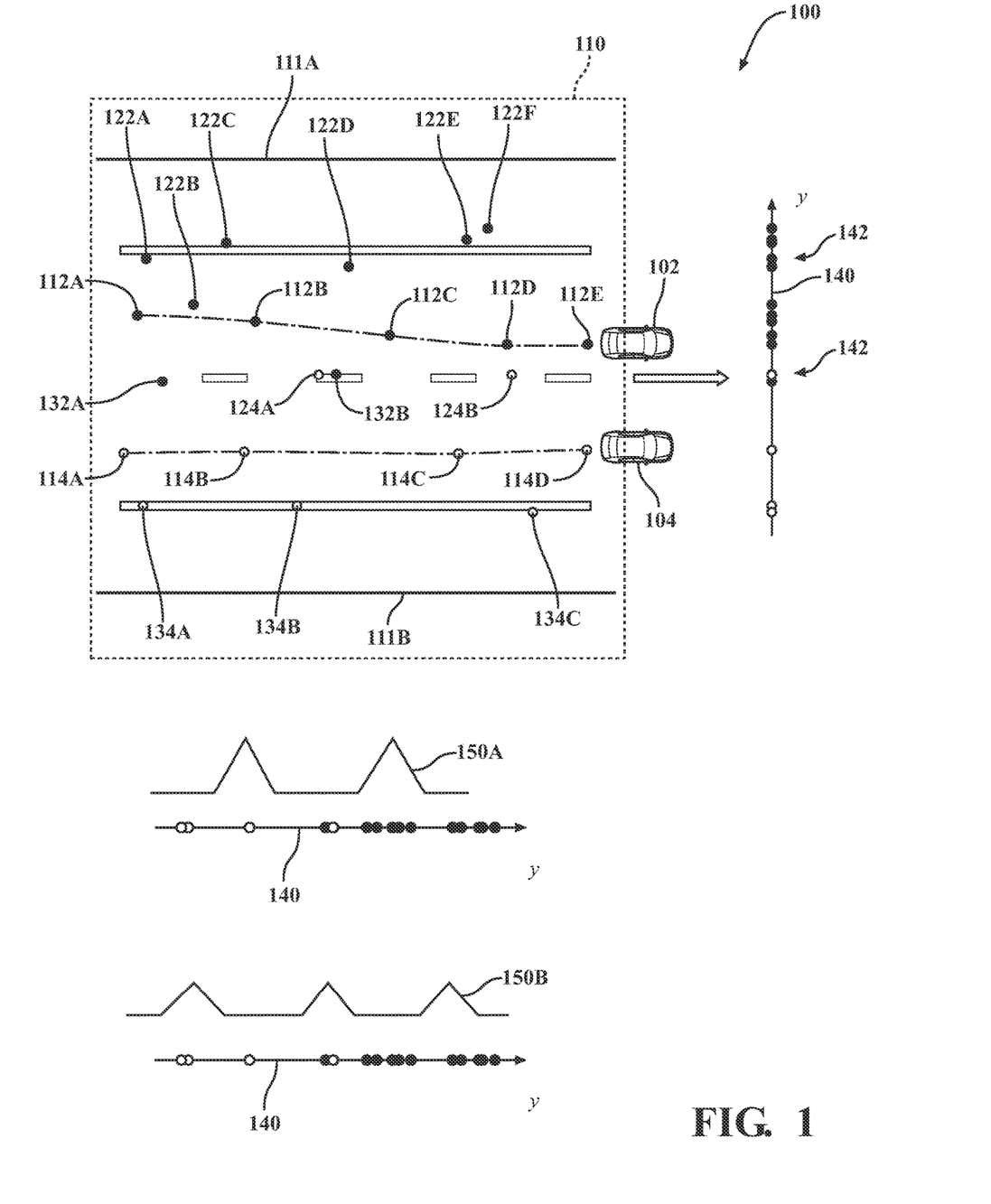
FIG. 1 illustrates a dataflow of a semantic map generating system.

FIG. 1 illustrates a data flow of a semantic map generating system 100. The semantic map generating system 100 receives sensor data from any suitable sensors. As an example, the semantic map generating system 100 may receive sensor data from mobile sensors such as vehicle sensors and/or stationary sensors such as roadside sensors or infrastructure sensors. The sensor data includes trace points and key points. Trace points 112A, 12B, 112C. 112D, 112E (collectively known as 112), 114A. 114B, 114C, 114D (collectively known as 114) refer to positions of vehicles 102, 104 respectively. Key points 122A, 122B, 122C, 122D. 122E, 122F (collectively known as 122). 132A. 132B (collectively known as 132) refer to lane markings identified in the sensor data and associated with the trace points 112. In other words, and as an example, when the vehicle 102 is at the trace point 112A, sensors on the vehicle 102 detected lane markings at key points 122A, 122B. 132A. Similarly, key points 124A. 124B (collectively known as 124), 134A. 134B. 134C (collectively known as 134) refer to lane markings identified in the sensor data and associated with the trace points 114. In other words, and as an example, when the vehicle 104 is at the trace point 114A, sensors on the vehicle 104 detected lane markings at key points 124A, 134A.

The semantic map generating system 100 may receive sensor data related to a portion of a road. As an example, the portion of the road may extend from a first end of the road at a first intersection to a second end of the road at a second intersection. As such, the road may be of any suitable length without any intersections. The semantic map generating system 100 may aggregate the sensor data for the road into a common reference system such that the relationship between the vehicles 102, 104, the trace points 112, 114, the key points 122, 132, 124, 134 are consistent. As an example, the common reference system may be based on the Global Positioning System (GPS).

The semantic map generating system 100 may divide the road and the sensor data into multiple road segments 110 and the sensor data 112, 114, 122, 124, 132, 134 associated with the road segments 110. The size of the road segment 110 may be based on a curve of the road, and/or the number of trace points 112, 114 and key points 122, 132, 124, 134 within a road segment 110. In other words, the semantic map generating system 100 may divide the road into road segments 110 so as to minimize edges 111A. 111B (collectively known as 111) of the road segment 110 being curved. The semantic map generating system may divide the road into road segments 110 that are large enough to include multiple trace points 112, 114 and key points 122, 132, 124, 134 such that the amount of trace points 112, 114 and key points 122, 132, 124, 134 are sufficient for determining and generating an accurate semantic map and small enough to keep noise to a minimum. The semantic map generating system 100 may divide the road segments 110 so as to minimize merging and/or splitting of lanes from occurring in the road segments. As an example, the semantic map generating system 100 may divide the road segment at the point of the merge or the point of the split.

The semantic map generating system 100 then generates an orthogonal axis 140. The orthogonal axis 140 is orthogonal to the edges 111A, 111B. The semantic map generating system 100 then projects the trace points 112, 114 and the key points 122, 132, 124, 134 onto the orthogonal axis at related positions 142, as shown.

The semantic map generating system 100 generates a range of weighting functions 150A, 150B (collectively known as 150) to represent different lane combinations (e.g., number of lanes and lane widths). The weighting functions 150 include various weights for different points along the orthogonal axis 140. As an example, the weights are highest at the points that the semantic map generating system 100 hypothesizes that the lane boundaries are.

The semantic map generating system 100 may generate the range of weighting functions 150 based on characteristics of the environment surrounding the road segment 110. As an example, in a case where the distance between the edges 111 of the road segment 110 is about 10 meters, the semantic map generating system 100 may generate weighting functions 150 with one lane, two lanes, and/or three lanes considering that lane widths in the location (or environment) of the road segment 110 are a minimum of 3 meters wide. The semantic map generating system 100 may generate weighting functions 150 where the lane boundaries are of the same length or of different lengths.

The semantic map generating system 100 may apply the range of weighting functions 150 to the positions 142 on the orthogonal axis 140 and output a score for each weighting function 150. This score is based on a sum of weighted positions 142. The semantic map generating system 100 may also slide the weighting function 150 along the orthogonal axis 140, apply the weighting function 150 at various offsets during the slide to the coordinates, and output a score (based on a sum of the weighted positions 142) for the weighting function 150 at the various positions.

The semantic map generating system 100 then compares the scores for the weighting functions 150 at the various position offsets and selects the weighting function 150 at a position offset that is associated with the highest score. The semantic map generating system 100 arranges the lane boundaries on the road segment 110 based on the selected weighting function 150 at the selected position offset. The semantic map generating system 100 then re-constitutes the road segments 110 with the lane boundary information back into the road.

Figure 2:
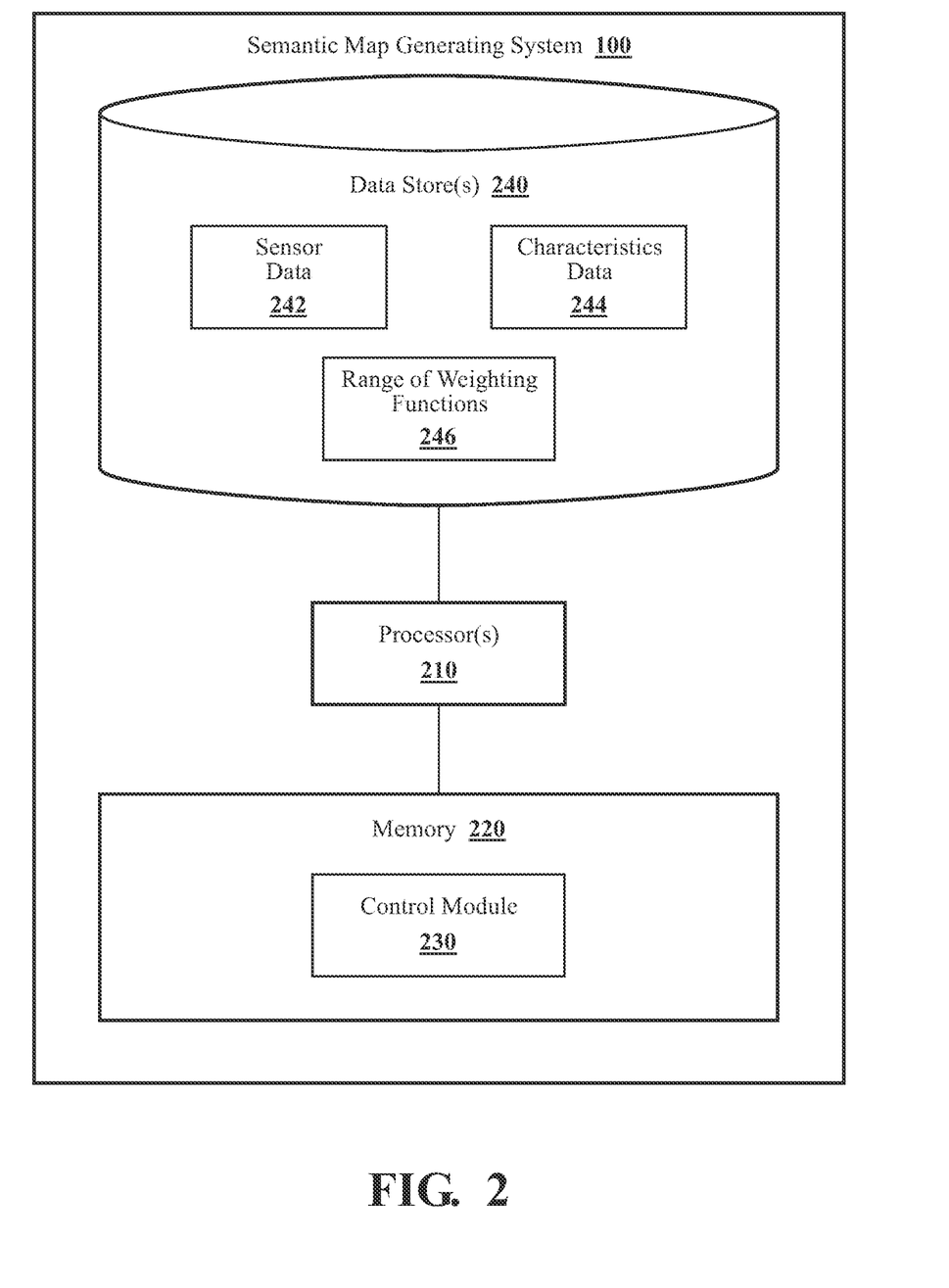
FIG. 2 illustrates one embodiment of the semantic map generating system.

With reference to FIG. 2, one embodiment of the semantic map generating system 100 of FIG. 1 is further illustrated. The semantic map generating system 100 is shown as including a processor 210. Accordingly, the processor 210 may be a part of the semantic map generating system 100, or the semantic map generating system 100 may access the processor 210 through a data bus or another communication path. In one or more embodiments, the processor 210 is an application-specific integrated circuit (ASIC) that is configured to implement functions associated with a control module 230. In general, the processor 210 is an electronic processor, such as a microprocessor, which is capable of performing various functions as described herein.

In one embodiment, the semantic map generating system 100 includes a memory 220 that stores the control module 230 and/or other modules that may function in support of generating a semantic map of a road. The memory 220 is a random-access memory (RAM), read-only memory (ROM), a hard disk drive, a flash memory, or another suitable memory for storing the control module 230. The control module 230 is, for example, machine-readable instructions that, when executed by the processor 210, cause the processor 210 to perform the various functions disclosed herein. In further arrangements, the control module 230 is a logic, integrated circuit, or another device for performing the noted functions that includes the instructions integrated therein.

Furthermore, in one embodiment, the semantic map generating system 100 includes a data store 240. The data store 240 is, in one arrangement, an electronic data structure stored in the memory 220 or another data store, and that is configured with routines that can be executed by the processor 210 for analyzing stored data, providing stored data, organizing stored data, and so on. Thus, in one embodiment, the data store 240 stores data used by the control module 230 in executing various functions.

For example, as depicted in FIG. 2, the data store 240 includes the sensor data 242, characteristics data 244, and a range of weighting functions data 246, along with, for example, other information that is used and/or produced by the control module 230. The sensor data 242 includes information about the positions 112, 114 of the vehicles 102, 104 and the positions 122, 124, 132, 134 of detected lane markings. Vehicle sensors and/or any other suitable sensors may detect the positions 112, 114 of the vehicles 102, 104 and the positions 122, 124, 132, 134 of detected lane markings.

The characteristics data 244 may include characteristics of the road, such as location of the road, width of the road, length of the road, type of road (e.g., a country road, a highway, a paved road, an unpaved road), time of day, and weather. The semantic map generating system 100 may receive characteristics of the road from various sensors, surrounding infrastructure, or external databases. The characteristics data 244 may include historical data such as lane number-lane width configurations associated with the road and/or the road segment 110. The characteristics data 244 may further include lane number-lane width configurations associated with other road segments on the road.

The range of weighting functions 246/150 includes weighting functions based on varying lane number and lane width configurations. As an example, the weighting functions 150 could be based on one 6-meter lane configuration, two 4-meter lane configuration, three 3-meter lane configuration, and/or four (two 5-meter lane, one 4-meter lane, one 3-meter lane) lane configuration. The semantic map generating system 100 may generate the range of weighting functions 150 based on the characteristics data 244. As such, the semantic map generating system 100 may initially generate a large range of weighting functions 150 without considering any factors such as location of the road, etc. The semantic map generating system 100 may then include such considerations to customize and reduce the number of weighting functions 150 in the range of weighting functions 150. As an example, the semantic map generating system 100 may customize and reduce the number of weighting functions 150 based on historical information for the road segment 110. In such an example, the semantic map generating system 100 may consider previous lane number-lane width configurations associated with the road segment 110. The semantic map generating system 100 may further customize the range of weighting functions 150 based on lane number-lane width configurations of neighboring road segments.

While the semantic map generating system 100 is illustrated as including the various data elements, it should be appreciated that one or more of the illustrated data elements may not be included within the data store 240 in various implementations and may be included in a data store that is external to the semantic map generating system 100. In any case, the semantic map generating system 100 stores various data elements in the data store 240 to support functions of the control module 230.

In one embodiment, the control module 230 includes instructions that, when executed by the processor(s) 210, cause the processor(s) 210 to receive sensor data 242 related to a road segment 110, generate an orthogonal axis 140 related to the road segment 110, and project the sensor data 242 onto the orthogonal axis.

In one or more arrangements, the control module 230 receives sensor data 242 related to a portion of a road. Additionally and/or alternatively, the control module 230 may receive the sensor data 242 related to a road segment 110, which is a portion of the road. The sensor data 242 may be from vehicle sensors or any other suitable sensors. The control module 230 may receive the sensor data 242 from the vehicle sensors and/or the other sensors. As previously mentioned, the sensor data 242 may include the position 112, 114 of the vehicles 102, 104 and the position 122, 124, 132, 134 of detected lane markings. In other words, the sensor data 242 may include the position 112, 114 of vehicle 102, 104 and vehicle sensor (also known as a trace point) and the position 122, 124, 132, 134 of lane markings (also known as key points) detected by the vehicle sensor while in that position 112, 114.

In one or more arrangements, the control module 230 divides the road into multiple road segments including the road segment 110. The control module 230 may determine the size of the road segments based on the curve of the road and/or the number of trace points 112, 114 and key points 122, 124, 132, 134 in the road segments 110. As an example, the control module 230 may divide the road into road segments 110 such that the edges 111 of road segments 110 within a curved portion of the road are relatively straight. As another example, the control module 230 may divide the road into road segments 110 based on the amount of trace points 112, 114 and key points 122, 124, 132, 134. The control module 230 may determine a suitable number of trace points 112, 114 and key points 122, 124, 132, 134 to maximize accuracy and minimize noise using any suitable method or process. The control module 230 may divide the road into road segments 110 that may be of equal sizes or may be of unequal sizes.

In one or more arrangements, the control module 230 generates the orthogonal axis 140 related to the road segment 110. As previously mentioned, the orthogonal axis 140 is orthogonal to an axis along the edge 11 of the road segment 110. As such, the orthogonal axis 140 is a cross-section of the road and/or road segment 110 and extends from one edge 111B of the road segment 110 to the other edge 111A of the road segment 110.

In one or more arrangements, the control module 230 projects the sensor data 242 onto the orthogonal axis 140. In other words, the control module 230 projects the trace points 112, 114 and the key points 122, 124, 132, 134 onto the orthogonal axis 140. To further explain, the control module 230 reduces the two-dimensional coordinates of the trace points 112, 114 and key points 122, 124, 132, 134 to one-dimensional coordinates 142 on the orthogonal axis 140.

In one embodiment, the control module 230 includes instructions that, when executed by the processor(s) 210, cause the processor(s) 210 to generate a range of weighting functions 150 based on potential characteristics of the road segment 110, determine scores based on applying the range of weighting functions 150 to the sensor data 242 along the orthogonal axis 140, and select one weighting function 150 from the range of weighting functions 150 based the highest score among the scores.

In one or more arrangements, the control module 230 generates the range of weighting functions 150 based on the potential characteristics of the road segment 110. The potential characteristics of the road segment 110 include the number of lanes in the road segment 110, the width of the lanes in the road segment 110, the position of lane marking(s) on the road segment 110, and/or the position of boundaries (or edges) of the road segment 110. As previously mentioned, the range of weighting functions 150 may include various lane number-lane width configurations. The weighting functions 150 may assign higher values to the hypothetical positions of the lane boundaries and lower values to the remaining positions. As an example, the weighting functions 150 can have non-zero values such as 1 at the hypothetical positions of the lane boundaries and zero values at the remaining positions. The control module 230 may generate the range of weighting functions 150 using any suitable method or process such as a permutation generation process.

In one or more arrangements, the control module 230 may generate the range of weighting functions 150 based on historical information. As previously mentioned, historical information may be lane number-lane width configurations previously associated with the road segment 110. As an example, in a case where the road segment 110 had been recorded in a mapping database as having two lanes, the control module 230 may begin by limiting the range of weighting functions to two lanes of varying lane widths, and may expand the range of weighting functions 150 to include less than two lanes and/or more than two lanes if the control module 230 is unable to secure a match with the initial range of weighting functions 150 limited to two lanes.

In one or more arrangements, the control module 230 may generate the range of weighting functions 150 based on characteristics of the environment of the road segment. As previously mentioned, the characteristics of the environment of the road and/or the road segment may be the width of the road, the length of the road, the type of road, and/or the location of the road. As an example, the control module 230 may receive information from a local database indicating that roads in the related location typically have three lanes. As such, the control module 230 may limit the range of weighting functions to three lanes of varying widths.

In one or more arrangements, the control module 230 may generate the range of weighting functions 150 based on characteristics of a neighboring road segment. A neighboring road segment may be adjacent to or in close proximity to the road segment 110. As an example, in a case where the control module 230 has resolved the lane number-lane width configuration of a neighboring segment, the control module 230 may generate the range of weighting functions 150 based on the resolved lane number or lane widths. In such an example, the control module 230 may limit the range of weighting functions 150 to one lane less than the resolved lane number to one lane more than the resolved lane number. Further, the control module 230 may limit the range of the weighting functions 150 to 1 meter less than the resolved lane widths to 2 meters more than the resolved lane widths.

The control module 230 may generate the range of weighting functions 150 without any lane number or lane width restrictions. Alternatively, the control module 230 may consider any suitable restrictions such as data storage units, and computational capability when generating the range of weighting functions 150. The range of weighting functions 150 may include a first range of weighting functions 150A for the trace points 112, 114 and/or a second range of weighting functions 150B for the key points 122, 124, 132, 134.

In one embodiment, the control module 230 includes instructions that, when executed by the processor(s) 210, cause the processor(s) 210 to determine a plurality of scores based on applying the range of weighting functions 150 to the sensor data 242 along the orthogonal axis 140. As an example, the control module 230 may align each weighting function in the first range of weighting functions 150A along the orthogonal axis 140, multiply each weighting function with peaks associated with the trace points 112, 114 along the orthogonal axis 140, and add the values from the multiplication, resulting in a set of trace point sub-scores. The control module 230 may then align each weighting function in the second range of weighting functions 150B along the orthogonal axis 140, multiply each weighting function with peaks associated with the key points 122, 124, 132, 134 along the orthogonal axis 140, and add the values from the multiplication, resulting in a set of key point sub-scores. Upon applying the range of weighting functions 150 to the trace points 112, 114 and key points 122, 124, 132, 134 along the orthogonal axis 140, the control module 230 produces a set of trace point sub-scores and a set of key point sub-scores. The control module 230 may then generate a variety of scores based on a sum of one trace point sub-score from the set of trace point sub-scores and one key point sub-score from the set of key point sub-scores. As such, the variety of scores may be based on both the set of trace point sub-scores and a set of key point sub-scores. Alternatively, the variety of scores may be based on the set of trace point sub-scores or the set of key point sub-scores.

In one embodiment, the control module 230 includes instructions that, when executed by the processor(s) 210, cause the processor(s) 210 to select a subset of weighting functions 150A. 150B from the range of weighting functions 150 based on the highest score(s) among the variety of scores. The control module 230 may compare the values of the scores and select the highest score. The subset of weighting functions 150A, 150B may be a smaller set than the range of weighting functions 150. As an example, the subset of weighting functions 150A, 150B may include a single weighting function 150A. The single weighting function 150A, 150B may be applied to the set of trace points 112, 114 or the set of key points 122, 124, 132, 134. As another example, the subset of weighting functions may include two weighting functions 150A, 150B. In such an example, a first of the two weighting functions 150A may be applied to the set of trace points 112, 114 and a second of the two weighting functions 150B may be applied to the set of key points 122, 124, 132, 134.

As an example, in a case where the variety of scores is based on one of the set of trace point sub-scores or the set of key point sub-scores, the control module 230 may select the one weighting function associated with the highest trace point sub-score or key point sub-score. As another example, in a case where the variety of scores is based on the set of trace point sub-scores and the set of key point sub-scores, the control module 230 may select two weighting functions such that a first weighting function associated with the highest trace point sub-score and a second weighting function associated with the highest key point sub-score. The control module 230 may then select the one or two weighting functions 150A. 150B that the control module 230 used to generate the highest score as the lane number-lane width configuration of the road segment 110. Additionally, the control module 230 may compare the highest score to a threshold value and in a case where the highest score meets or exceeds the threshold value, the control module 230 may select the weighting function 150A. 150B associated with the highest score. In a case where the highest score falls below the threshold, the control module 230 may expand the range of weighting functions 150 with alternative lane number-lane width configurations.

In one embodiment, the control module 230 includes instructions that, when executed by the processor(s) 210, cause the processor(s) 210 to determine characteristics of the road segment 110 based on the selected weighting function(s). The control module 230 may determine the characteristics of the road segment 110 by assigning lane boundaries on the road segment 110 to correspond to the hypothetical lane boundaries in the selected weighting function(s) 150A, 150B. The control module 230 may determine the number of lanes in the road segment 110, the widths of the lanes in the road segment 110, the positions of the lane markings, and/or the positions of the lane boundaries (or edges) based on the selected weighting function(s) 150A, 150B.

In one or more arrangements, the control module 230 may re-constitute the road segments 110 with the identified lane boundaries into a single road. The control module 230 may update the characteristics data or any (internal or external) database with the characteristics of the road and/or road segment 110.

Figure 3:
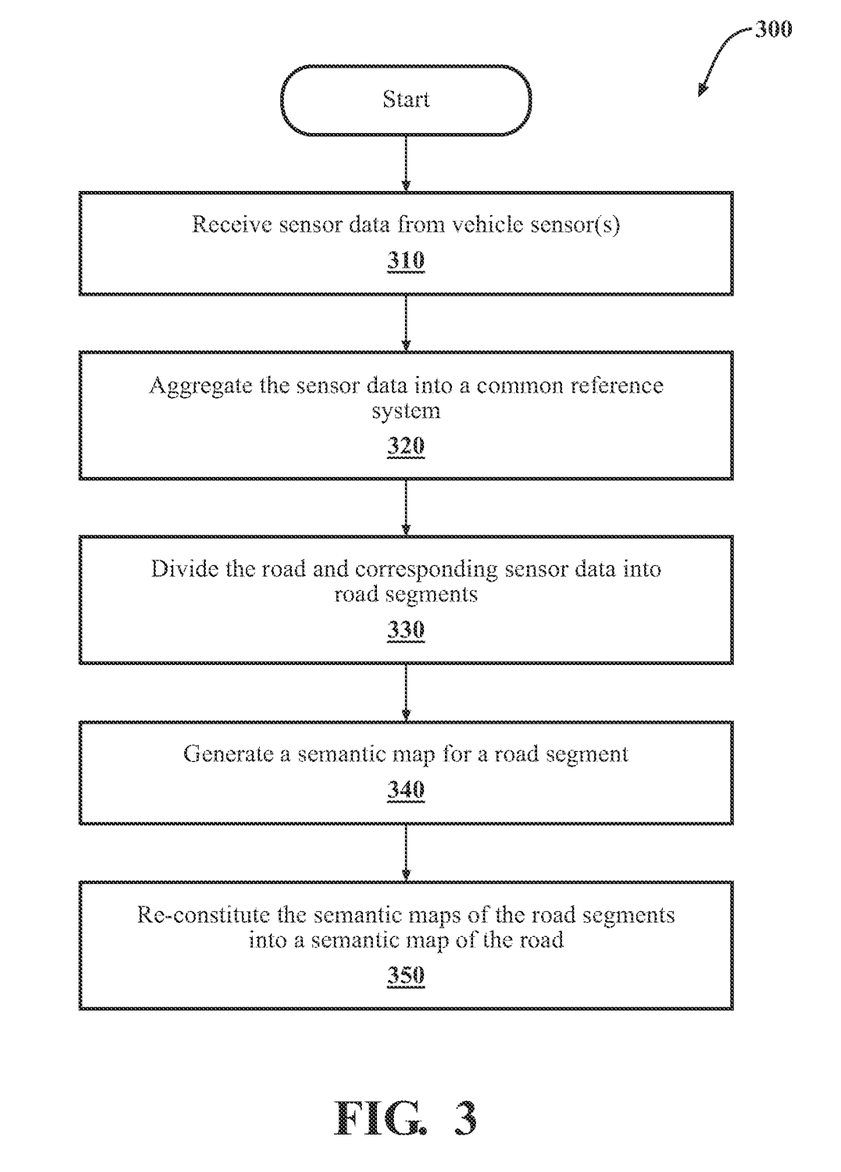
FIG. 3 is a flowchart illustrating one embodiment of a method associated with generating a semantic map at a road level.

FIG. 3 is a flowchart illustrating one embodiment of a method 300 associated with generating a semantic map for a road. The method 300 will be described from the viewpoint of the semantic map generating system 100 of FIGS. 1-2. However, the method 300 may be adapted to be executed in any one of several different situations and not necessarily by the semantic map generating system 100 of FIGS. 1-2.

At step 310, the control module 230 may cause the processor(s) 210 to receive sensor data 242 from vehicle sensor(s). Additionally and/or alternatively, the control module 230 may receive sensor data 242 from other sensors, stationary sensors and/or mobile sensors. The sensor data 242 may include geographical coordinates indicating the trace points 112, 114, which refer to the positions of the vehicle 102, 104 and geographical coordinates indicating the key points 122, 124, 132, 134, which refer to the lane markings detected by the vehicle sensors.

At step 320, the control module 230 may cause the processor(s) 210 to aggregate the sensor data 242 into a common reference. As an example, the control module 230 may combine the sensor data 242 from various sources into a common reference system. In such a case, the control module 230 transforms the sensor data 242 and hence the points 112, 114, 122, 124, 132, 134 so that they are represented relative to the same single frame.

At step 330, the control module 230 may cause the processor(s) 210 to divide the road and the corresponding sensor data 242 into multiple road segments 110 with corresponding sensor data 242. As previously explained, the control module 230 may divide the road into road segments 110 based on the curve of the road and the amount of sensor data within the road segments 110.

At step 340, the control module 230 may cause the processor(s) 210 to generate a semantic map for the road segment 110 as explained below in greater detail.

At step 350, the control module 230 may cause the processor(s) 210 to receive and combine the semantic maps for the road segments 110 into a semantic map for the road.

Figure 4:
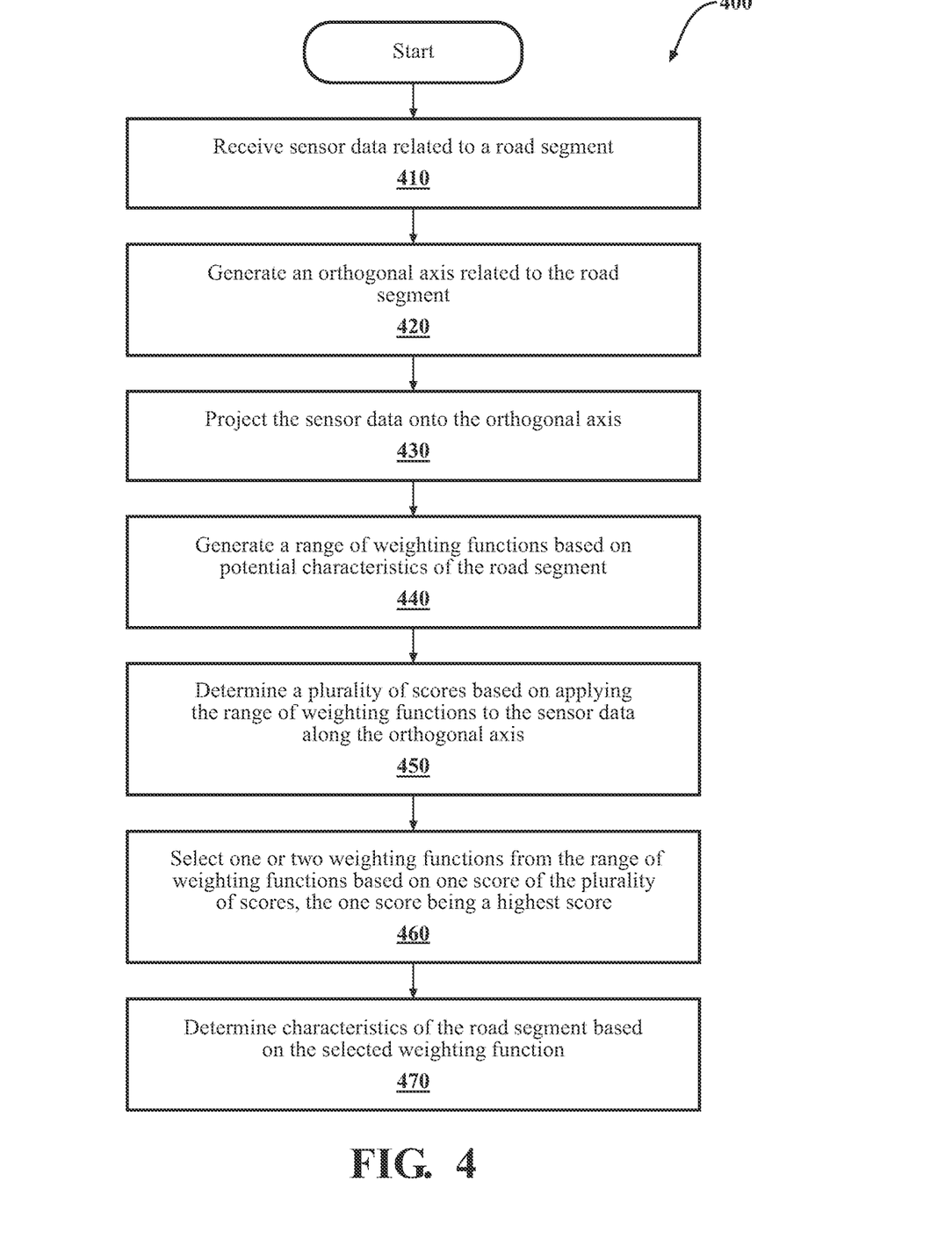
FIG. 4 is a flowchart illustrating one embodiment of a method associated with generating a semantic map at a road segment level.

FIG. 4 is a flowchart illustrating one embodiment of a method 400 associated with generating a semantic map for a road segment 110. The method 400 will be described from the viewpoint of the semantic map generating system 100 of FIGS. 1-2. However, the method 400 may be adapted to be executed in any one of several different situations and not necessarily by the semantic map generating system 100 of FIGS. 1-2.

At step 410, the control module 230 may cause the processor(s) 210 to receive sensor data 242 related to the road segment 110. As previously mentioned, the sensor data 242 includes trace points 112, 114 and key points 122, 124, 132, 134 from sensors on multiple vehicles.

At step 420, the control module 230 may cause the processor(s) 210 to generate an orthogonal axis 140 related to the road segment 110. As previously mentioned, the orthogonal axis 140 is orthogonal to the edge 111 of the road segment 110.

At step 430, the control module 230 may cause the processor(s) 210 to project the sensor data 242 onto the orthogonal axis 140. As previously mentioned, the trace points 112, 114 and the key points 122, 124, 132, 134 are placed on the orthogonal axis 140 based on the positions of the trace points 112, 114 and the key points 122, 124, 132, 134 on the road segment 110.

At step 440, the control module 230 may cause the processor(s) 210 to generate a range of weighting functions 150 based on potential characteristics of the road segment 110. The range of weighting functions 150 include various lane number-lane width configurations. The control module 230 may determine the lane number-lane width configuration based on historical information, characteristics of an environment of the road segment 110, and/or characteristics of a neighboring road segment.

At step 450, the control module 230 may cause the processor(s) 210 to determine a plurality of scores based on applying the range of weighting functions 150 to the sensor data 242 along the orthogonal axis 140. As previously described, the control module 230 determines a sum based on the product of the weighting function(s) 150A. 150B and the trace points 112, 114 and/or key points 122, 124, 132, 134 along the orthogonal axis 140.

At step 460, the control module 230 may cause the processor(s) 210 to select a subset of weighting functions 150A, 150B from the range of weighting functions 150 based on one score of the plurality of scores, the one score being a highest score.

At step 470, the control module 230 may cause the processor(s) 210 to determine characteristics of the road segment 110 based on the subset of weighting functions 150A. 150B. Based on the subset of weighting functions 150A, 150B, the control module 230 may determine the number of lanes in the road segment 110, the width of the lanes in the road segment 110, positions of the lane markings on the road segment 110, and/or positions of boundaries of the road segment 110.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied. e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality." as used herein, is defined as two or more than two. The term "another," as used herein, is defined as at least a second or more. The terms "including" and/or "having." as used herein, are defined as comprising (i.e., open language). The phrase "at least one of . . . and . . . " as used herein refers to and encompasses any and all possible combinations of one or more of the associated listed items. As an example, the phrase "at least one of A. B, and C" includes A only, B only. C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor; and
   a memory storing machine-readable instructions that, when executed by the processor, cause the processor to:
   receive sensor data related to a road segment, the sensor data including trace points and key points and the road segment being a portion of a road;
   aggregate the sensor data into a common reference system such that relationships between the trace points and the key points are consistent;
   generate an orthogonal axis related to the road segment;
   project the sensor data onto the orthogonal axis;
   generate a range of weighting functions based on lane number-lane width configurations associated with the road and based on lane number-lane width configurations associated with a second road segment, the second road segment neighboring the road segment;
   determine a plurality of scores based on applying the range of weighting functions to the sensor data along the orthogonal axis;
   select a subset of weighting functions from the range of weighting functions based on one score of the plurality of scores, the one score being a highest score; and
   determine characteristics of the road segment based on the subset of weighting functions, the characteristics of the road segment including a width of one or more lanes in the road segment.

2. The system of claim 1, wherein the characteristics of the road segment include at least one of:
   number of lanes in the road segment;
   a position of one or more lane markings on the road segment; or
   a position of one or more boundaries of the road segment.

3. The system of claim 1, wherein the sensor data is generated from a plurality of vehicle sensors.

4. The system of claim 1, wherein the machine-readable instructions further include instructions that when executed by the processor cause the processor to:
   divide the road into a plurality of road segments based on a curve of the road, wherein the plurality of road segments includes the road segment.

5. The system of claim 1, wherein the machine-readable instructions further include instructions that when executed by the processor cause the processor to:
   generate the range of weighting functions based on historical information.

6. The system of claim 1, wherein the machine-readable instructions further include instructions that when executed by the processor cause the processor to:
   generate the range of weighting functions based on characteristics of an environment of the road segment.

7. The system of claim 1, wherein the machine-readable instructions further include instructions that when executed by the processor cause the processor to:
   generate the range of weighting functions based on characteristics of a neighboring road segment.

8. A method comprising:
   receiving sensor data related to a road segment, the sensor data including trace points and key points and the road segment being a portion of a road;
   aggregating the sensor data into a common reference system such that relationships between the trace points and the key points are consistent;
   generating an orthogonal axis related to the road segment;
   projecting the sensor data onto the orthogonal axis;
   generating a range of weighting functions based on lane number-lane width configurations associated with the road and based on lane number-lane width configurations associated with a second road segment, the second road segment neighboring the road segment;
   determining a plurality of scores based on applying the range of weighting functions to the sensor data along the orthogonal axis;
   selecting a subset of weighting functions from the range of weighting functions based on one score of the plurality of scores, the one score being a highest score; and
   determining characteristics of the road segment based on the subset of weighting functions, the characteristics of the road segment including a width of one or more lanes in the road segment.

9. The method of claim 8, wherein the characteristics of the road segment include at least one of:
   number of lanes in the road segment;
   a position of one or more lane markings on the road segment; or
   a position of one or more boundaries of the road segment.

10. The method of claim 8, wherein the sensor data is generated from a plurality of vehicle sensors.

11. The method of claim 8, further comprising:
    dividing the road into a plurality of road segments based on a curve of the road, wherein the plurality of road segments includes the road segment.

12. The method of claim 8, further comprising:
    generating the range of weighting functions based on historical information.

13. The method of claim 8, further comprising:
    generating the range of weighting functions based on characteristics of an environment of the road segment.

14. The method of claim 8, further comprising:
    generating the range of weighting functions based on characteristics of a neighboring road segment.

15. A non-transitory computer-readable medium including instructions that when executed by a processor cause the processor to:

receive sensor data related to a road segment, the sensor data including trace points and key points and the road segment being a portion of a road;

aggregate the sensor data into a common reference system such that relationships between the trace points and the key points are consistent;

generate an orthogonal axis related to the road segment;

project the sensor data onto the orthogonal axis;

generate a range of weighting functions based on lane number-lane width configurations associated with the road and based on lane number-lane width configurations associated with a second road segment, the second road segment neighboring the road segment;

determine a plurality of scores based on applying the range of weighting functions to the sensor data along the orthogonal axis;

select a subset of weighting functions from the range of weighting functions based on one score of the plurality of scores, the one score being a highest score; and determine characteristics of the road segment based on the subset of weighting functions, the characteristics of the road segment including a width of one or more lanes in the road segment.

16. The non-transitory computer-readable medium of claim 15, wherein the characteristics of the road segment include at least one of:

number of lanes in the road segment;

a position of one or more lane markings on the road segment; or a position of one or more boundaries of the road segment.

17. The non-transitory computer-readable medium of claim 15, wherein the sensor data is generated from a plurality of vehicle sensors.

18. The non-transitory computer-readable medium of claim 15, wherein the instructions further include instructions that when executed by the processor cause the processor to:

divide the road into a plurality of road segments based on a curve of the road, wherein the plurality of road segments includes the road segment.

19. The non-transitory computer-readable medium of claim 15, wherein the instructions further include instructions that when executed by the processor cause the processor to:

generate the range of weighting functions based on historical information.

20. The non-transitory computer-readable medium of claim 15, wherein the instructions further include instructions that when executed by the processor cause the processor to:

generate the range of weighting functions based on characteristics of a neighboring road segment.

* * * * *